US006325879B1

(12) United States Patent
Heckman et al.

(10) Patent No.: US 6,325,879 B1
(45) Date of Patent: Dec. 4, 2001

(54) METHOD OF APPLYING A LABEL TO A CONTAINER HAVING A CURVED PORTION

(75) Inventors: Russell W. Heckman; James A. Herman, both of Perrysburg; Larry P. Shiple; Walter E. Traxler, both of Toledo, all of OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 1104 days.

(21) Appl. No.: 08/693,585

(22) Filed: Aug. 7, 1996

Related U.S. Application Data

(63) Continuation of application No. 08/006,079, filed on Jan. 19, 1993, now abandoned.

(51) Int. Cl.[7] ..................... B32B 31/00

(52) U.S. Cl. ..................... 156/86; 156/212; 156/215; 156/DIG. 9

(58) Field of Search ..................... 156/86, 212, 215, 156/218, 291, 448, 449, 450, 451, 456, 457, 458, 578, DIG. 26

(56) References Cited

U.S. PATENT DOCUMENTS 4,416,714 * 11/1983 Hoffmann ..................... 156/86
4,574,020 3/1986 Fosnaught .
4,626,455 12/1986 Karabedian .
4,632,721 12/1986 Hoffmann .
4,671,836 6/1987 Fumei .
4,724,029 2/1988 Kontz .
4,729,811 3/1988 DiFrank .
4,844,760 * 7/1989 Dickey ..................... 156/215
4,923,557 * 5/1990 Dickey ..................... 156/456 X
5,091,239 * 2/1992 Przeworski et al. ..................... 156/215 X

* cited by examiner

*Primary Examiner*—Richard Crispino

(57) ABSTRACT

A method of applying a label to a container which includes an intermediate portion of the side wall thereof which has an annular curved surface wherein the vertical height of the portion having a curved surface is a minor portion of the entire height of the container. A narrow rectangular label of shrinkable material is first provided with one or more longitudinally extending strips of adhesive extending intermediate the longitudinal edges of the label at the area of the label which is to contact the portion of greatest diameter on the curved portion of the container. The strip of adhesive material is shorter than the length of the label so that the adhesive material does not contact the overlapping edges of the label. An adhesive is applied to the trailing edge of the label only and the label is wrapped about the compound curved portion with the adhesive strip engaging the curved portion of the container at the area of greatest diameter. The edges of the label are overlapped and bonded and the overlapped label is then shrunk into position by moving the container and label through an oven. The curved portion of the container may have a compound curvature.

12 Claims, 2 Drawing Sheets

METHOD OF APPLYING A LABEL TO A CONTAINER HAVING A CURVED PORTION

This application is a continuation of copending application Ser. No. 08/006,079 filed on Jan. 19, 1993, now abandoned.

This invention relates to applying labels to containers by a wrap and shrink process.

BACKGROUND AND SUMMARY OF THE INVENTION

In the application of labels to containers having curved surfaces, such as carbonated beverage containers of glass or plastic, it has been common to wrap a label of shrinkable material about the generally cylindrical side wall of a container and then shrink the label about the container. It has also been common to have the label be wrapped about a curved shoulder or heal surface of the container as well as the cylindrical side wall and then be shrunk thereon. Methods and apparatus have been used wherein adhesives or solvents are applied to the leading edge and trailing edge of the label as shown, for example, in U.S. Pat. Nos. 4,574,020, 4,632,721, 4,671,836, 4,724,029, 4,729,811 and 4,844,760.

However, where the portion of the container to which the label is to be applied is curved and has a narrow vertical height relative to the height of the side wall, it has been found that it is difficult to wrap the narrow label about the curved portion of the container in an apparatus that handles many containers per minute. The leading and trailing edges tend to overlap in a skewed relationship. The problem is even more acute where the curved portion of the container has a compound curvature and the portion of the container with the greatest diameter is not centrally located with respect to the upper edge and lower edge of label.

Accordingly, among the objectives of the present invention are to provide a method of applying a narrow shrinkable label by wrapping the label about a curved portion of a container and holding the label for sufficient time to permit shrinking the narrow label into conformity with the curved portion; wherein the container may have a compound curved portion and which method provides a uniform shrinkage about the compound curved portion with the upper and lower edges of the narrow label being in conformity thereto.

In accordance with the invention a method is provided for applying a label to a container which includes an intermediate curved portion of the side wall thereof, which may have a compound curvature, wherein the vertical height of the curved portion is a minor portion of the entire height of the container. A narrow rectangular label of shrinkable material is first provided with a continuous or interrupted longitudinally extending strip of adhesive extending intermediate the longitudinal edges of the label at the area of the label which is to contact the portion of greatest diameter on the curved portion of the container. The strip of adhesive material is shorter than the length of the label so that the adhesive material does not contact the overlapping edges of the label. The label is wrapped about the compound curved portion with the adhesive strip engaging the curved portion of the container at the area of greatest diameter. The edges are overlapped and bonded and the overlapped label is then shrunk into position by moving the container and label through an oven. The bonding of the edges may be by adhesive, solvent or heat sealing. If adhesive or solvent is used as a bonding agent, it is applied to the only trailing edge of the label.

DESCRIPTION

Figure 1:
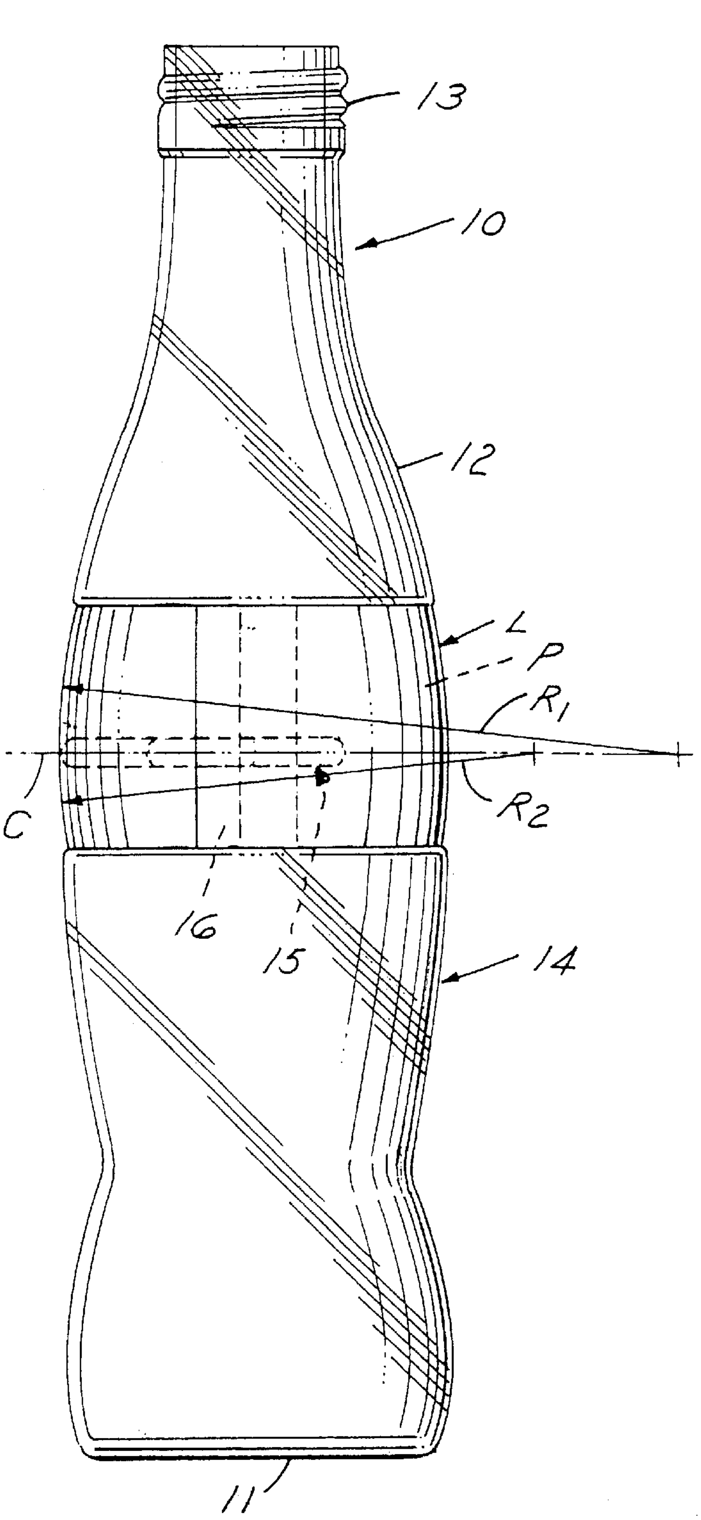
FIG. 1 is an elevational view of a container embodying the invention.
Figure 2:
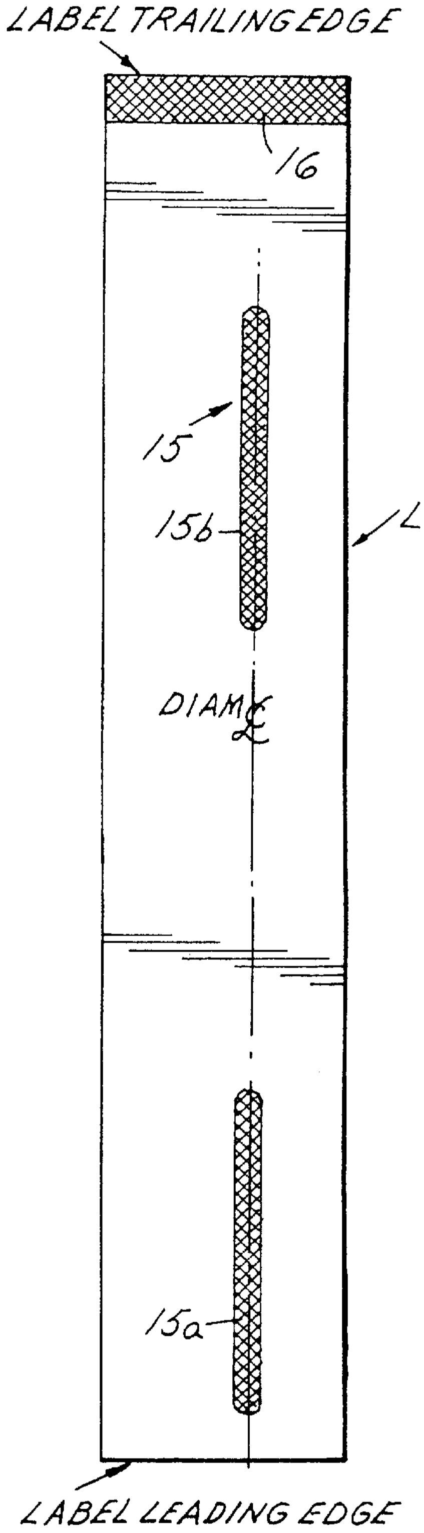
FIG. 2 is a plan view of a label taken from the side which is positioned adjacent the container.
Figure 3:
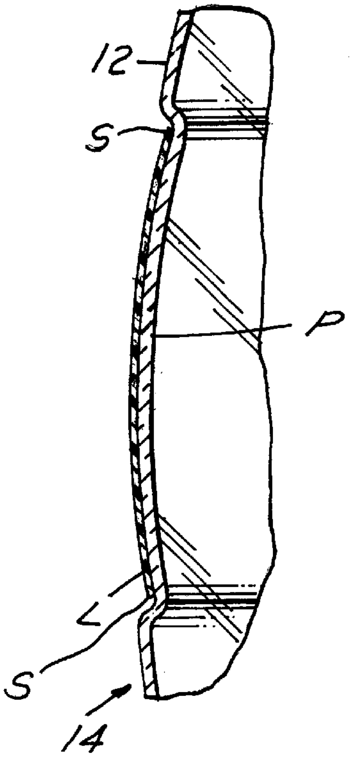
FIG. 3 is a fragmentary vertical sectional view of a portion of the container in FIG. 1.

Referring to FIGS. 1–3, as shown in FIG. 1, the container 10 is made of glass or plastic and includes a base 11, a shoulder 12, a neck or finish 13 and a side wall 14 which is threaded for receiving a closure, as where the container is used to hold carbonated beverages or liquids. A narrow rectangular label L is shrunk about an annular recessed portion P of the container which is intermediate adjacent the shoulder and the upper edge of the side wall. The curved portion P is shown as having a compound curvature wherein one radius $R_1$ has a different radius and center than the other radius $R_2$. As a result the center line C of the compound curved portion P having the greatest diameter is not at the axial midpoint of portion P. As shown radius $R_2$ is shorter than radius $R_1$ and has its center on center line C which is spaced from the axial midpoint of the portion P such that and the portion of the curved portion P of the container having the greatest diameter is spaced axially below from the axial midpoint of portion P. As shown, the vertical height of the recessed portion P of the container is a minor portion of the height of the side wall of the container 10.

Figure 4:
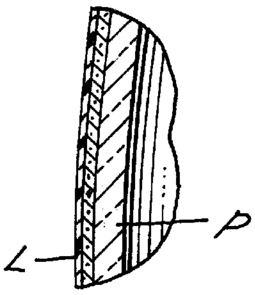
FIG. 4 is a fragmentary sectional view on an enlarged scale of a portion of the wall of the container.
Figure 5:
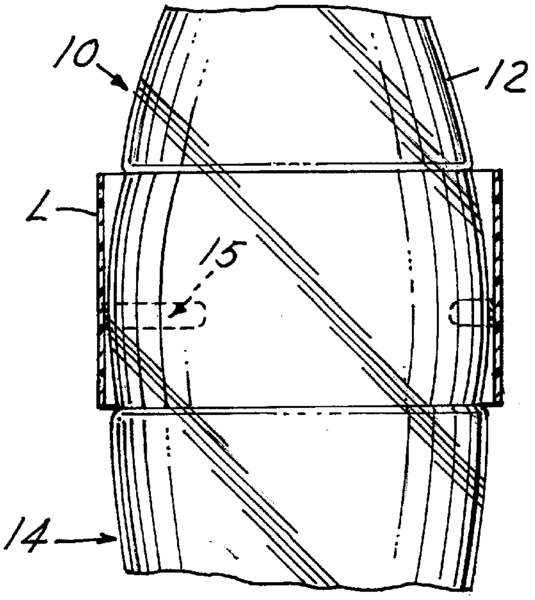
FIG. 5 is a fragmentary elevational view of a portion of the container after the label has been wrapped about the container and before it has been shrunk on the container.
Figure 6:
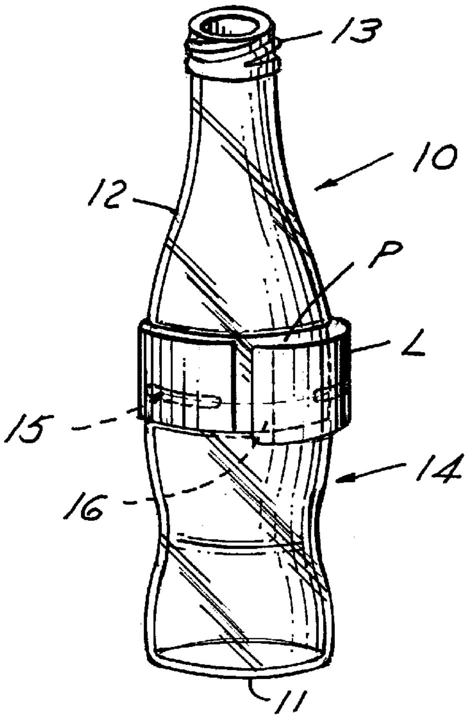
FIG. 6 is a perspective view of the container with the label partially wrapped about the container.

As shown in FIGS. 3–5, the label L which is generally rectangular and has a width substantially equal to the vertical height of the recessed compound curved portion P is provided with a hot adhesive in a narrow longitudinally extending strip 15 that is at the line C of greatest diameter of the compound curved portion P. As shown in FIG. 2, preferably the strip is interrupted with portion 15*a* spaced from the leading edge and a portion 15*b* aligned with portion 15*a* and spaced from the trailing edge a greater distance than the portion 15*a* is spaced from the leading edge.

As the label L is first wrapped around the container 10, the adhesive line 15 is aligned with and engages the portion of greatest diameter of the compound curvature. The leading and trailing edges are then overlapped and bonded to one another as by using adhesive, solvent or heat sealing. As shown in FIG. 2, an additional line 16 of adhesive or solvent is applied only at the trailing edge of the label L. As shown in FIG. 5, adhesive strip 15 is applied and the edges are overlapped and bonded to hold the label L in position at least long enough for the container and the label L to be wrapped around the container. The leading and trailing edges are overlapped and the container, with the label L applied thereto. The container with the label applied is moved through an oven to shrink the label into conformity with the compound curved portion P of the container so that the side edges S are at the axial extremities of the recessed compound curved portion P.

The strip of adhesive is preferably applied by a spray gun spaced from the label so that as the label moves past the spray gun, a line of adhesive is applied.

As used herein, the term adhesive is intended to cover any bonding agent that will hold the label in position as it is wrapped until the leading and trailing edges are overlapped and the container, with the label applied thereto, is moved through an oven to shrink the label into conformity with the compound curved portion P of the container such that the side edges of the label are at the axial extremities of the compound curved portion P.

The label L may be made of any shrinkable material such as plastic including multilayer labels comprising a foam layer and a non-foam layer such as shown, for example, in U.S. Pat. No. 4,626,455 incorporated herein by reference.

A satisfactory apparatus which can be used with the addition of a spray mechanism and the elimination of application of any bonding agent to the leading edge such as shown in U.S. Pat. No. 4,729,811, incorporated herein by reference.

It can thus be seen that there has been provided a method of applying a narrow label by wrapping the label about a curved portion of the container and holding the label for sufficient time to permit shrinking the narrow label into conformity with the curved portion; wherein the container may have a compound curved portion; and which method provides a uniform shrinkage about the compound curved portion with the upper and lower edges of the narrow label being in conformity thereto.

What is claimed is:

1. A method of applying a label to a container which has a base, a side wall, a shoulder and a neck which includes an intermediate portion of the side wall thereof which has a continuous curvature in an axial direction wherein the axial height of the curved portion is a portion of the entire height of the side of the container, said curved portion having an upper end and a lower end, said curved portion having a portion of greatest diameter transverse to the axial height of the curved portion of said container, said portion of greatest diameter being spaced from the upper end and the lower end of said curved portion, said curved portion of said container having a compound continuous curvature comprising portions having different radii such that the curved portion of the container has a greatest diameter spaced from the transverse center line of the curved portion, comprising providing a rectangular label of shrinkable material having a leading edge and a trailing edge and spaced upper and lower longitudinal edges, said rectangular label having a width between said longitudinal edges, applying a strip of bonding material along a longitudinally extending line extending longitudinally of said strip intermediate the upper and lower longitudinal edges of the label spaced from the longitudinal center line of the label substantially the same distance as the portion of greatest diameter of the container is spaced from the center line of the curved portion of the container at the area of the label which is to contact the portion of greatest diameter on the curved portion of the container and such that said strip of bonding material is spaced from the leading and trailing edges of the label such that it does not contact the leading and trailing edges of the label, wrapping the label about the curved portion of the container with the bonding material engaging the container at the portion of greatest diameter of the curved portion, overlapping the leading and trailing edges of the label, bonding the overlapped leading and trailing edges, and shrinking the overlapped label into position on the curved portion of the container by moving the container and label through an oven.

2. The method set forth in claim 1 wherein said strip of bonding material is interrupted.

3. The method set forth in claim 1 wherein said compound curved portion of the container has two radii, the centers of which are spaced from one another.

4. The method set forth in claim 1 wherein said strip of bonding material applied between the leading and trailing edges of the label comprises a hot melt adhesive.

5. The method set forth in claim 1 wherein said step of applying bonding material to the overlapping edges comprises applying a bonding material to the trailing edge only of said label.

6. The method set forth in claim 1 wherein the step of bonding the overlapped leading and trailing edges comprises applying a bonding material to the trailing edge of the label which consists of a bonding material selected from the group comprising a hot melt adhesive and solvent.

7. The method set forth in claim 1 wherein said step of applying said strip of bonding material to the overlapped leading and trailing edges of the label comprises heat sealing the overlapped edges.

8. The method set forth in claim 1 wherein said container is a glass container.

9. The method set forth in claim 1 wherein said container comprises a plastic container.

10. The container with a label applied thereto in accordance with any one of method claims 1–2 and 3–9.

11. The container with a label applied thereto in accordance with the method set forth in claim 10 wherein said curved portion of said container to which the label is applied comprises a recessed portion of the container which has upper and lower edges and the step of wrapping the label about the container comprising positioning the label between said upper and lower edges of said recessed portion.

12. The container with a label applied thereto set forth in claim 11 wherein the vertical height of said curved portion of said container is a minor portion of the vertical height of the side wall of the container and the width of the label is substantially equal to the vertical height of the curved portion.

* * * * *